(12) United States Patent
Anderson et al.

(10) Patent No.: US 10,885,172 B2
(45) Date of Patent: *Jan. 5, 2021

(54) SYSTEMS FOR IDENTITY VALIDATION AND ASSOCIATION

(71) Applicant: Filevine, Inc., Provo, UT (US)

(72) Inventors: Ryan M. Anderson, Las Vegas, NV (US); Nathan Morris, Las Vegas, NV (US); James Blake, Las Vegas, NV (US); Wesley A. Cooper, Kalispell, MT (US)

(73) Assignee: FILEVINE, INC., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,920

(22) Filed: Sep. 11, 2019

(65) Prior Publication Data

US 2020/0004945 A1 Jan. 2, 2020

Related U.S. Application Data

(63) Continuation of application No. 16/183,505, filed on Nov. 7, 2018, now Pat. No. 10,430,574, which is a continuation of application No. 15/432,530, filed on Feb. 14, 2017, now Pat. No. 10,127,368.

(60) Provisional application No. 62/302,011, filed on Mar. 1, 2016.

(51) Int. Cl.
*H04L 29/06* (2006.01)
*G06F 21/32* (2013.01)
*G06F 21/33* (2013.01)

(52) U.S. Cl.
CPC .............. *G06F 21/32* (2013.01); *G06F 21/33* (2013.01)

(58) Field of Classification Search
None
See application file for complete search history.

(56) References Cited

U.S. PATENT DOCUMENTS 8,787,627 B1 * 7/2014 Freedman .......... G06K 9/00906
382/115
2005/0138382 A1 * 6/2005 Hougaard ............. H04L 9/3247
713/176
2006/0131385 A1 * 6/2006 Kim ....................... G06Q 20/40
235/379

(Continued)

OTHER PUBLICATIONS

U.S. Appl. No. 62/302,011, filed Mar. 1, 2016, Anderson et al.

(Continued)

*Primary Examiner* — Shin-Hon (Eric) Chen
(74) *Attorney, Agent, or Firm* — Workman Nydegger

(57) ABSTRACT

The present disclosure describes a computer-implemented platform for managing electronic endorsable instruments and electronic endorser verification information in order to validate endorser identity. A computer system receives an endorsable electronic instrument and a mobile phone number associated with a targeted potential endorser. The endorsable electronic instrument and a verification information request are sent to the mobile phone number by sending a link to an endorsement application via a message to the mobile phone number. The endorsed electronic instrument and corresponding verification information are received and are associated to validate the endorsed instrument.

16 Claims, 4 Drawing Sheets

(56) References Cited

U.S. PATENT DOCUMENTS

| | | | | |
|---|---|---|---|---|
| 2008/0235043 A1* | 9/2008 | Goulandris | G06F 21/33 | 705/1.1 |
| 2011/0178899 A1* | 7/2011 | Huszar | G06Q 40/04 | 705/27.2 |
| 2011/0207434 A1* | 8/2011 | Rozhkov | G06F 21/32 | 455/411 |
| 2013/0019289 A1* | 1/2013 | Gonser | H04L 63/08 | 726/6 |
| 2014/0041052 A1* | 2/2014 | Follis | G06F 21/10 | 726/28 |
| 2014/0115702 A1* | 4/2014 | Li | H04L 9/3273 | 726/23 |
| 2014/0115713 A1* | 4/2014 | Picazo | G06F 21/64 | 726/26 |
| 2015/0013008 A1* | 1/2015 | Lukacs | G06F 21/53 | 726/24 |
| 2015/0127748 A1* | 5/2015 | Buryak | G06F 16/9535 | 709/206 |
| 2015/0195092 A1* | 7/2015 | Bartkiewicz | G09C 5/00 | 713/176 |
| 2016/0043867 A1* | 2/2016 | Bonsignore | H04L 9/3247 | 713/168 |
| 2016/0204944 A1* | 7/2016 | Follis | H04L 9/3247 | 713/176 |
| 2016/0224978 A1* | 8/2016 | Chou | G06Q 20/227 | |
| 2017/0201518 A1* | 7/2017 | Holmqvist | H04L 63/10 | |
| 2017/0236230 A1* | 8/2017 | Thomas | G06Q 50/01 | 705/51 |

OTHER PUBLICATIONS

U.S. Appl. No. 15/432,530, filed Feb. 14, 2017, Anderson et al.
U.S. Appl. No. 16/183,505, filed Nov. 7, 2018, Anderson et al.
U.S. Appl. No. 15/432,530, Aug. 31, 2018, Notice of Allowance.
U.S. Appl. No. 16/183,505, Jan. 23, 2019, Office Action.
U.S. Appl. No. 16/183,505, May 20, 2019, Notice of Allowance.

* cited by examiner

SYSTEMS FOR IDENTITY VALIDATION AND ASSOCIATION

CROSS-REFERENCE TO RELATED APPLICATIONS

This application is a continuation of U.S. patent application Ser. No. 16/183,505, filed on Nov. 7, 2018 and titled "SYSTEMS FOR IDENTITY VALIDATION AND ASSOCIATION," which is a continuation of U.S. patent application Ser. No. 15/432,530, filed on Feb. 14, 2017 and titled "SYSTEMS FOR IDENTITY VALIDATION AND ASSOCIATION," which issued as U.S. Pat. No. 10,127,368 on Nov. 13, 2018, which claims priority to and the benefit of U.S. Patent Application Ser. No. 62/302,011, filed on Mar. 1, 2016 and titled "SYSTEMS FOR IDENTITY VALIDATION AND ASSOCIATION," the entirety of each of which are expressly incorporated herein by this reference.

BACKGROUND

Many business entities, firms, and other organizations in a variety of industry sectors utilize electronic documents, forms, and records in their communications and transactions with individuals and other entities. Often, these electronic instruments require signatures or other endorsements in order to have proper effect, or in order to conform to legal requirements, internal policies, or other protocols. Receiving the necessary endorsements, particularly when required signatories or endorsers are unavailable or disparately located, can be challenging.

In response to this need, some services have developed solutions with the aim of facilitating the sending and receiving of electronic endorsement requests and endorsed documents within a computer environment. For example, services have been developed which base the receiving and sending of endorsable documents on a potential endorser's email address, as provided by the party requesting the endorsement.

Although such services have been beneficial in facilitating the receipt of needed endorsements, there remains significant room for further technological improvement. A particular challenge to obtaining endorsements of electronic instruments is authentication of the endorsing party's identity. Prior solutions must assume that an email address to which the electronic instrument is sent corresponds to and is accessible by the intended endorser, and is not accessible by others. Unfortunately, this is not always the case, and in any event, may be difficult to prove satisfactorily if the validity of the endorsement is later questioned.

BRIEF SUMMARY

Embodiments described herein are directed to computer systems, computer-implemented methods, and computer hardware storage media for advancing centralized computer-implemented management of endorsable electronic information and electronic verification information in order to validate endorser identity.

In particular, embodiments described herein include receiving an endorsable electronic instrument (e.g., an electronic document, form, certificate, or other instrument requiring a signature, stamp, imprint, thumb/fingerprint, or other endorsement) from an endorsement requesting party. A mobile phone number associated with a targeted potential endorser is also received, and the mobile phone number is associated with the endorsable electronic instrument. The endorsable electronic instrument and an associated verification information request is sent to the mobile phone number associated with the targeted potential endorser (e.g., by sending a link to a web-based application via SMS/MMS message). An endorsed electronic instrument and electronic verification information is received from the mobile phone number associated with the endorser, and the verification information is associated with the endorsed electronic instrument to validate the endorsed instrument. The validated endorsed instrument is sent to the endorsement requesting party.

Embodiments herein also include one or more technical mechanisms for centralizing monitoring and management of electronic endorsement requests by generating electronic verification information requests and associating them with electronic endorsement requests, and associating received electronic verification information with received electronically endorsed instruments.

BRIEF DESCRIPTION OF THE DRAWINGS

To further clarify the above and other advantages and features of the present disclosure, a more particular description of the invention will be rendered by reference to specific embodiments thereof which are illustrated in the appended drawings. It is appreciated that these drawings depict only illustrated embodiments of the invention and are therefore not to be considered limiting of its scope. Embodiments of the invention will be described and explained with additional specificity and detail through the use of the accompanying drawings in which.

DETAILED DESCRIPTION

Figure 1:
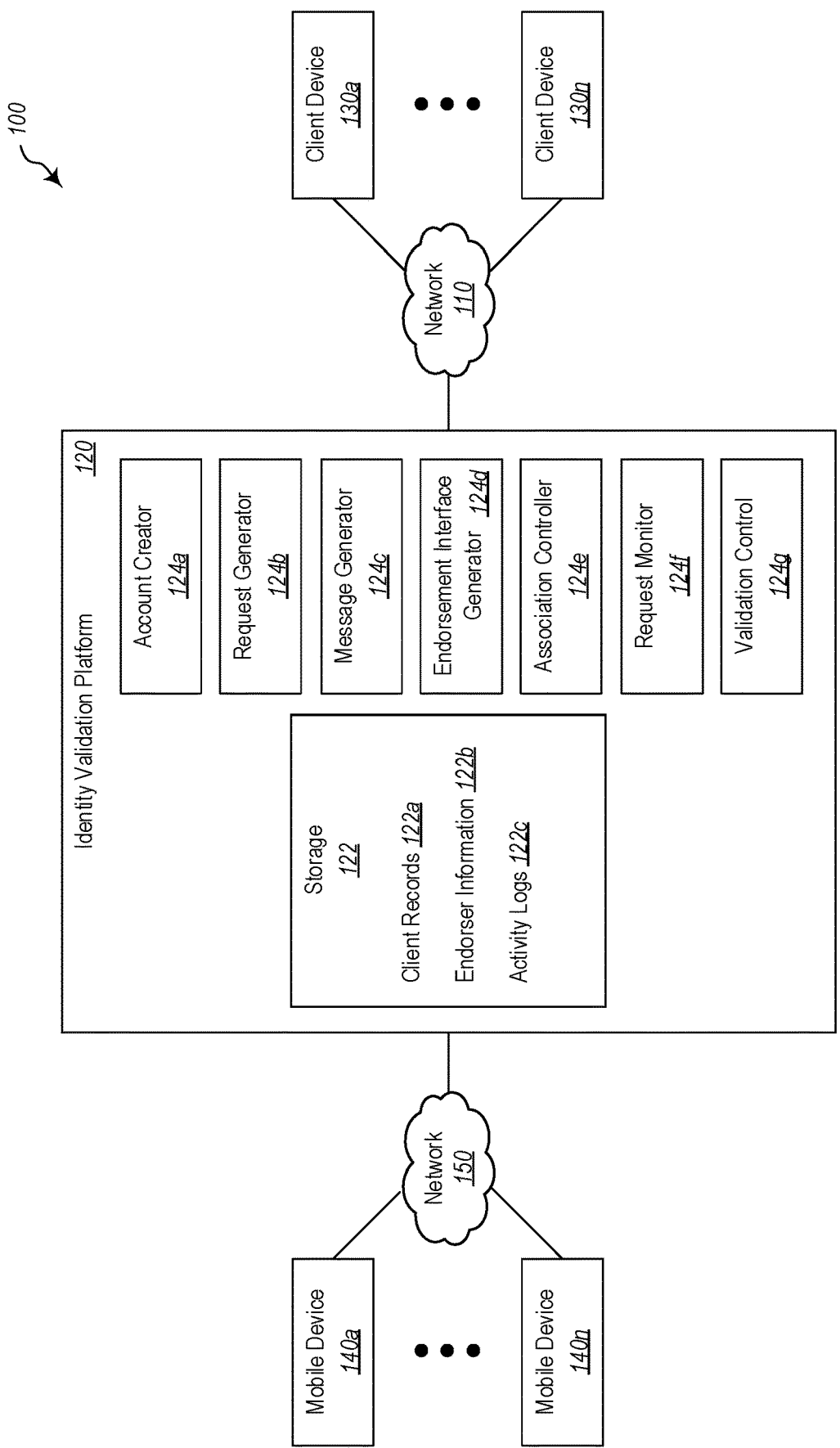
FIG. 1 illustrates a computing environment that can be used to communicate endorsable information and associate verification information with endorsed information in order to validate identity.

As described above, a particular challenge to obtaining endorsements of electronic instruments is authentication of the endorsing party's identity. Prior solutions must assume that an email address to which the electronic instrument is sent corresponds to and is accessible by the intended endorser, and is not accessible by others. Unfortunately, this is not always the case, and in any event, may be difficult to prove satisfactorily if the validity of the endorsement is later questioned Such challenges are particular to the environment of electronic communications, and are rooted in the fact that communications using computer technology inherently create one or more additional layers of potential identity theft, identity error, or identity confusion as compared to traditional methods of authenticating an endorsement (e.g., by checking identification documents of an endorser signing a physical document).

Another particular challenge is related to the fact that, although digital communications are often necessary in order to meet time deadlines and enable quick-turnaround, there are many individuals and organizations that do not have access to email; that do not understand how to use email in the context of receiving an electronic instrument, signing it, and sending it back; or that do not have necessary equipment to enable such activity (e.g., computer system, internet connection, printer, scanner, etc.). In addition, email communications are often not attended to as frequently as some time-sensitive transactions require, and are often inadvertently filtered or labeled as spam. These facts limit the pool of potential endorsers capable of using these prior email based solutions, reducing the ability to receive needed endorsements or relegating the task to more time-consuming, more expensive, and less efficient methods, such as tracking the endorser down, physically meeting up with the endorser, or printing and mailing a physical copy of the document.

In addition, an influx and efflux of endorsement-related electronic communications can create challenges related to the handling, monitoring, and coordination of the communications. Communications may be lost, misdirected, mislabeled, or simply buried amidst the inflow and outflow of multiple communications. Where the ability to receive and direct such communications is reduced, efficiencies and capabilities are likewise reduced, and the potential for mistakes and failed endorsements is increased.

At least some of the embodiments described herein can beneficially increase the efficiency and effectiveness of electronic communication of endorsable instruments and their related electronic transactions. For example, the integration of SMS/MMS messaging within an identity validation platform enables communications to be directed to relatively simple and common devices (e.g., mobile devices such as mobile phones, tablets, watches, etc.). This can efficiently broaden the reach of the electronic endorsement transactions centralized within the identity validation platform. In addition, although many potential endorsers may have limited access to email, may not have or desire an email address, may not sufficiently check email relative to sensitive endorsement timeframes encountered, or may have spam filters limiting effective access via email, mobile phone SMS/MMS messages are in many instances more ubiquitous, more frequently monitored and responded to, responded to more quickly and conveniently, and are less subject to inadvertent filtering.

In addition, one or more embodiments can advantageously reduce the amount of data traffic passed through one or more networks linking the identity validation platform to clients, as it allows communications to be passed as relatively less data-intensive SMS/MMS messages linking to a centralized application in at least some instances, as opposed to sending and receiving full digital copies of the endorsable instruments of concern for a given desired electronic transaction in every or most communication. Further, the centralized data storage of the identity validation platform enables a reduction in the amount of data that must be stored across multiple devices. For example, an identity validation platform can store all endorsable instruments and verification data, rather than requiring each separate client device (e.g., requesting client device and potential endorser mobile device) to independently store one or more duplicative copies of endorsable electronic instruments and/or associated data.

Further, one or more embodiments described herein achieve these beneficial results while also providing effective authentication of the endorsing party. As described in detail below, embodiments of the present disclosure enable the association of electronic verification information with the received electronic endorsement in order to provide multiple factors of identity verification. The electronic identity verification functionality of at least some of the embodiments described herein can improve the functioning of an electronic communication platform. For example, features and components operable to assist in associating electronic communications with identity data can reduce the transfer of unsecured or malicious data within a computer network and/or across separate computer devices. Further, electronic communication flows may often be restricted or limited by identity validation checks. One or more of the embodiments described herein are configured to provide effective validation of electronic communications so that corresponding data flows are less restricted and communicative efficiency of corresponding computer networks may be improved.

FIG. 1 illustrates an exemplary architecture 100 in which communication of electronic endorsable instruments and electronic verification information are centralized in a computer-implemented identity validation platform. The illustrated embodiment includes an identity validation platform 120 in communication with one or more client computer devices 130a to 130n, and one or more mobile devices 140a to 140n. As indicated by the ellipses, architecture 100 can include any number of client computer devices 130a to 130n and any number of mobile devices 140a to 140n (referred to hereinafter as 130 and 140, respectively, for simplicity).

The identity validation platform 120 and the one or more client computer devices 130 are connected by (or are part of) a network 110, such as, for example, a Local Area Network ("LAN"), a Wide Area Network ("WAN"), and even the Internet. In addition, the identity validation platform 120 and the one or more mobile devices 140 can be connected by (or can be part of) network 150, which may be configured similar to network 110. In some embodiments, network 150 is a public switched telephone network (PSTN) and/or a mobile web network (e.g., 3G, LTE, etc.).

The illustrated identity validation platform 120 includes storage 122. The storage can be used for storing client records 122a, endorser information 122b, and activity logs 122c, for example. The identity validation platform 120 includes an account creator 124a configured to receive information from a client device 130 (e.g., through network 110) and to create corresponding client records. Such client information can include client identification or contact information (email address, phone number, point of contact), payment information, and records particular to a given client (e.g., usage history, endorsement request history, endorsements received, client communications), for example. The account creator 124a is configured to thereby establish a client account to enable endorsement requests to be received from the client 130.

The identity validation platform 120 also includes a request generator 124b configured to receive an endorsement request from a client device 130. The endorsement request includes, for example, one or more electronic documents, forms, and/or other instruments to be endorsed, the name of the targeted potential endorser for the electronic instrument(s), and a mobile phone number associated with the targeted potential endorser. The request generator 124b is also configured to generate a request record (e.g., to be stored in storage 122) and to associate the endorsement request data with the requesting client.

The identity validation platform 120 also includes a message generator 124c configured to generate and send a link (preferably a link to an Internet-based website) to a mobile device 140 (i.e. to the mobile phone number associated with the potential endorser) directing the potential endorser to an application (preferably a web-based application) that provides access to the one or more endorsable instruments and includes one or more objects for inputting the targeted potential endorser's endorsement and identity verification information (e.g., digital image, alphanumerical code), as described in more detail below. In some embodiments, the link is sent to the mobile device 140 as an SMS/MMS message. In some embodiments, the message includes additional instructions and/or keys (e.g., an alphanumeric code, pin, pose instructions for image) to enable input of appropriate verification information at the application.

Figure 2:
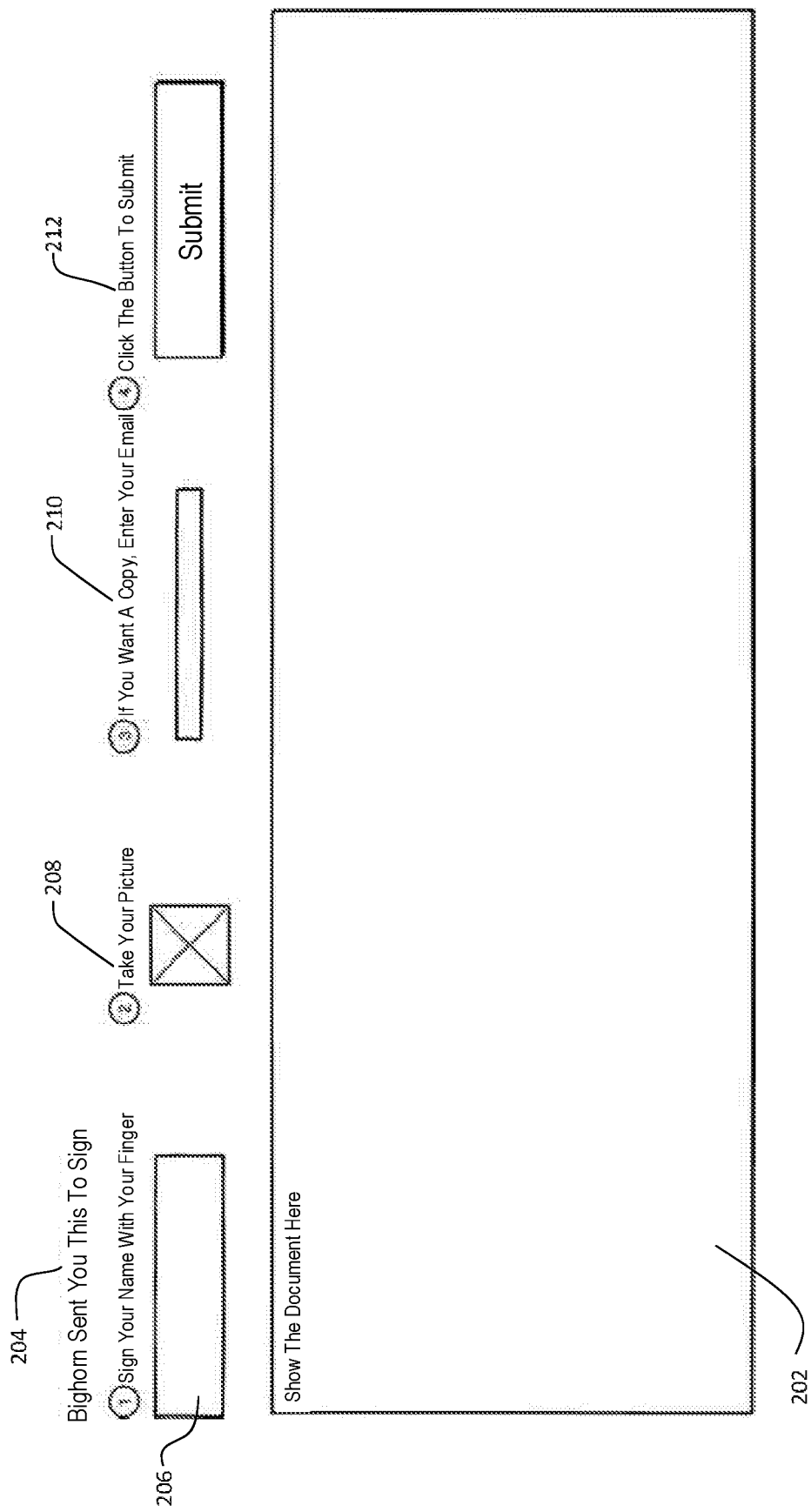
FIG. 2 illustrates an example user interface for receiving endorsable information and inputting verification information.

The identity validation platform 120 also includes an endorsement interface generator 124*d* configured to generate a user interface enabling the potential endorser to access and view the one or more endorsable instruments, to input one or more endorsements, and to input identity verification information. The generated interface is preferably associated with a web-based application made accessible to the potential endorser's mobile device 140 through the link delivered by the message generator 124*c*. FIG. 2, described in more detail below, illustrates an example of such a user interface.

The identity validation platform 120 also includes an association controller 124*e* configured to receive the endorsed electronic instrument(s) and corresponding identity verification information sent from the mobile device 140 (e.g., input through the endorsement interface), and to associate the received data with the corresponding requesting client records. In some embodiments, the association controller 124*e* is also configured to record additional information related to the received data, including time stamp(s), IP address(es), etc. The association controller 124*e* is also configured to send one or more digital copies of the endorsed instrument to the corresponding requesting client 130, and in some embodiments, to the endorser and/or other interested parties.

Figure 3:
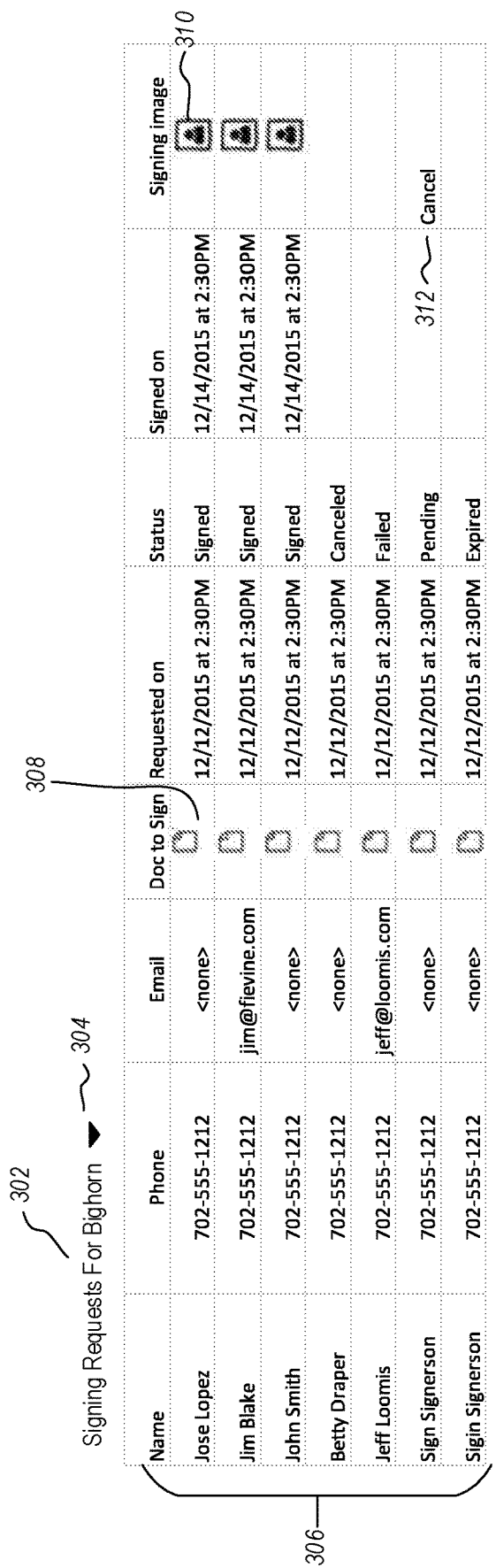
FIG. 3 illustrates an example user interface for monitoring and managing endorsement and verification requests.

The identity validation platform 120 also includes a request monitor 124*f* configured to monitor endorsement requests and assign an appropriate status to each request. In some embodiments, the request monitor 124*f* is configured to generate a user interface made presentable to an operator of the identity validation platform 120 and/or, in some embodiments, made accessible on a client device 130. An example of such a user interface is shown in FIG. 3 and is described in more detail below.

In some embodiments, the validation platform 120 also includes a validation control 124*g* configured to compare verification information received from the mobile device 140 and which is associated with one or more endorsed electronic instruments, with endorser information 122*b*, activity logs 122*c*, and/or other information in order to determine the validity of the verification information. For example, the validation control 124*g* can compare an image received from the mobile device 140 as part of the verification information with image data provided by the requesting client device 130 (e.g., using facial recognition algorithms and/or other image recognition algorithms) in order to check whether the image received as part of the verification information sufficiently matches the expected imagery data received from the requesting client device 130. In some embodiments, the validation control 124*g* is configured to perform one or more algorithms for approving received verification information, for flagging received verification information as unsuitable, and/or for flagging received verification information as requiring additional authentication measures.

In other embodiments, the validation control 124*g* is configured to compare a time stamp associated with an image taken by the mobile device 140 with the current time, a time stamp associated with an endorsement request, and/or a time stamp associated with image data provided by the requesting client device 130, for example. Here, the validation control 124*g* can compare the two times/timestamps in order to provide some verification of the endorsement. This may be done, for example, to ensure the verification image is sufficiently recent and/or to prevent the unauthorized reuse of certain images (e.g. to prevent a user from using an old picture stored in a social media application).

FIG. 2 illustrates an example user interface presented to a targeted potential endorser at a mobile device (e.g., as part of a web-application accessed through a link sent to the user's mobile device phone number). In FIG. 2, the user interface presents to a user, on a mobile device, an endorsable electronic document 202. As depicted, the user interface also presents a number of objects enabling the user to input an endorsement, to input verification information, to input additional information, and to submit the inputted data to the identity validation platform.

The illustrated user interface includes an object 204 indicating the source of the electronic document (e.g., the requesting client), in this example "Bighorn," and displaying to the user that "Bighorn sent you this to sign." The illustrated user interface also includes an endorsement object 206 configured to enable the input of the user's signature or other endorsement (e.g., fingerprint, thumbprint). In this example, the endorsement object 206 includes the instructions to "Sign your name with your finger," and is configured to receive the signature through the touch-screen hardware of the mobile device.

The illustrated user interface also includes a verification information object 208 configured to enable the input of information authenticating the user's identity. In this example, the object 208 includes an instruction to "Take your picture," (e.g., using a camera associated with the hardware of the mobile device) and the resulting verification information will thus include user/endorser image data. In some embodiments, the object 208 includes a silhouette showing where a user should be positioned for taking the picture. Additionally, or alternatively, other embodiments may include other forms of verification information, including voice recordings or other biometric indicators, entry of an alphanumeric code, or an image of the user in a certain pose, for example.

Further, image data may contain metadata that provides additional information concerning the situation and/or environment in which the image data was captured. For example, the metadata can include one or more of the following: a person's geographical location at the time the image data was captured, a timestamp associated with when the image data was captured, or any other relevant information that may be considered pertinent.

In some embodiments, the message sent to the user's mobile device includes additional instructions or keys enabling the user to enter the appropriate verification information upon accessing the endorsement user interface (e.g., by following the link generated by the identity validation platform and sent to the user's/endorser's mobile device). For example, the message can include instructions for inputting a specific key, code, or pin when accessing the user interface, instructions indicating a vocalized word or phrase to record, and/or instructions indicating a pose to make for taking a picture (e.g., hold up two fingers with left hand).

Additional methods of verification are also available through operation of one or more components described herein. For example, some embodiments may require that the user/endorser take a picture essentially contemporaneously with an endorsement or, alternatively, within a determined time period that is considered acceptable (e.g. a timer may start and be displayed to a user showing the user/endorser how much time is available to take the picture and have the endorsement be considered valid). One manner in which the picture may be verified is by scanning or crawling (through operation of the validation control 124g and/or other components) common social media applications in order to acquire additional pictures of the user/endorser and then comparing the two pictures to verify that the person captured in the picture actually is who he/she is asserting himself/herself to be.

Another manner in which the picture may be verified is by providing the user/endorser with a list of gestures that are desired to be made by the user/endorser while the picture is being captured. This list may be in the form of a textual description or in the form of an avatar that is performing the desired gesture. Some such gestures may require the following: a person's arms be folded in a certain manner, a certain number of fingers being held up, a person standing in a certain manner, etcetera. Additionally, a combination of these gestures and/or positions can be utilized. The important point is that the user/endorser is required to use a particular gesture while a picture is being taken so as to provide additional identity validation with regard to the electronic endorsement.

In another embodiment, a user/endorser may be required to write a code (e.g. a number and/or letter code combination) on a tangible medium and take the picture while holding the medium in a way that the code will be viewable in the picture. This code will be generated shortly before the picture is taken and can be a random code or a code that is based on a relevant factor (e.g. date and time, geographic location, etc.). Once the picture is taken with the code being clearly viewable in the picture, then the code, as it is written on the tangible medium, may be compared with the generated code to determine whether they match. If a match is found, then the picture is determined as genuine.

In yet another embodiment, instead of using static image data (e.g. a picture), a live action recording may be captured. By way of example, one embodiment may present to the user/endorser a short video clip that shows an avatar moving in a certain manner. After viewing the clip, the user/endorser may record himself/herself performing the same actions as the avatar. Following this recording, a comparison of the user/endorser and the avatar may be made to identify any discrepancies. Similar to the list of gestures, the user/endorser may be able to select from a list of possible video clips, each of which shows an avatar moving in a particular manner.

While the above embodiments relied on physical appearances and/or actions, a user/endorser may also use a sound recording to act as a method of verifying the endorsement. For instance, a user/endorser may be presented with a list of generated options that includes phrases, distinct words, or a combination of phrases and distinct words. Upon selecting one of the options, the user/endorser's voice will be recorded while saying the phrase, distinct word, or combination. Then, using voice recognition technology, the user's recitation of the saying will be compared with an acceptable rendition of the saying to identify any discrepancies. If the two sufficiently match, or in other words, if the user's recitation lies within an acceptable tolerance that is associated with the acceptable rendition of the saying, then the endorsement is verified and the voice recording acts as proof of that verification.

FIG. 2 also illustrates an object 210 enabling the input of additional information. In this example, the object 210 includes an instruction "If you want a copy, enter your email." The user interface can receive the email address and send a digital copy of the endorsed instrument to the endorser. The illustrated user interface also includes a submit object 212 enabling submission of the document after endorsement.

FIG. 3 illustrates an example user interface presented to an operator of the identity validation platform and/or presented to a client at a client device. As depicted, the user interface includes an object 302 indicating the client to which the displayed endorsement requests belong ("Bighorn" in this example). The object 302 can include a drop-down selection or other user-selectable object enabling the selection of other accounts or clients (e.g., in a version of the user interface presented to an operator of the identity validation platform). The illustrated user interface also displays a list 306 of the endorsement requests that have been made by or associated with the client "Bighorn." As depicted, the list 306 can display, for each separate request, the name of the targeted potential endorser, the potential endorser's mobile phone number, email address (which may be optional), document or instrument to be endorsed, request date, status, signature date (for documents that have been signed) and associated verification information (shown as "Signing Image" in this example).

As shown, the user interface displays the status of each endorsement request. Status may be displayed as, for example, "Pending" (e.g., a suitable request has been made to the potential endorser's mobile device, and the associated link has not expired, but no endorsement has been made yet), "Signed" (e.g., the endorser has signed the instrument and supplied the required verification information), "Expired" (e.g., a suitable request has been made but the link expired prior to endorsement by the potential endorser), "Failed" (e.g., phone number did not accept the SMS message including the link), and "Cancelled" (e.g., the client cancelled the request before it was endorsed).

In some embodiments, particularly in those embodiments where the link sent to the potential endorser's mobile device leads to a web-based application on the open Internet, the identity validation platform is configured to establish a time limit for the link (e.g., through the request monitor 124f). The time limit may be set to any desired time limit according to time sensitivities and/or other preferences, but will typically be about 2, 6, 12, 24, 48, 72, 96, 120, or 168 hours, or a range in between any two of these values.

The illustrated user interface also includes a user-selectable object 308 for each request enabling display or downloading of the document to be signed upon selection of the object 308. The illustrated user interface also includes a user-selectable object 310 for each signed instrument relating to the verification information associated with the signed instrument, enabling display or downloading of the verification information (e.g., image) upon selection of the object 310. The illustrated user interface also includes a user-selectable object 312 for each pending request enabling status of the request to be changed from "Pending" to "Cancelled."

Figure 4:
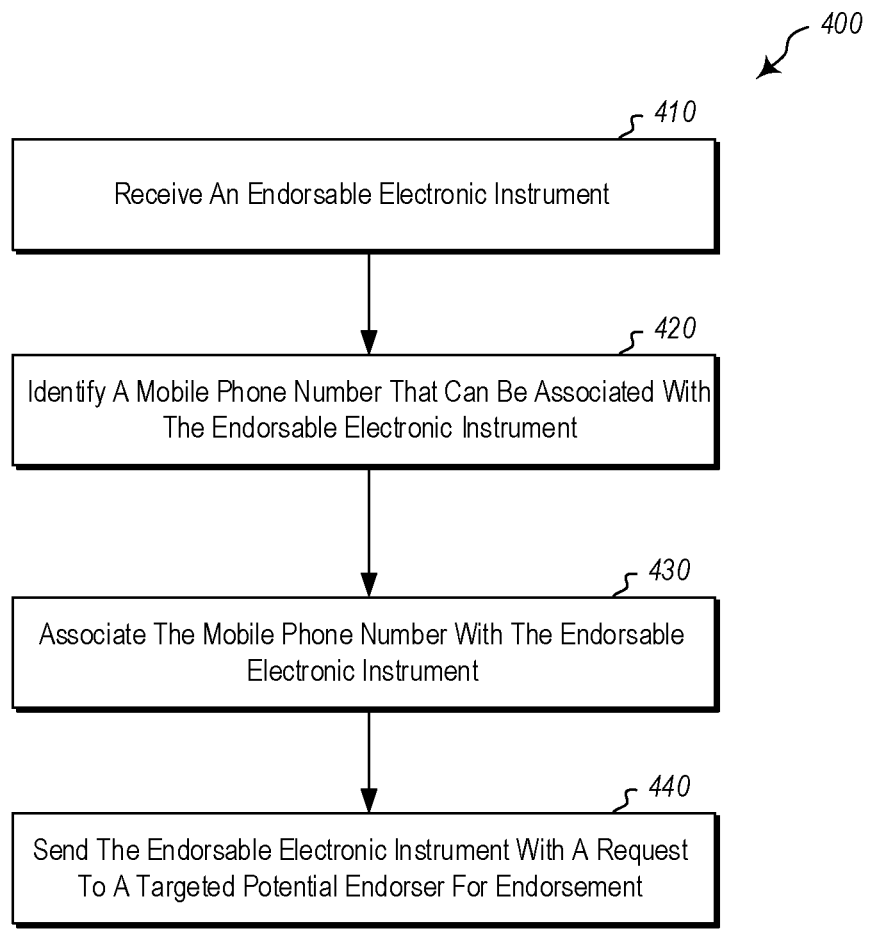
FIG. 4 illustrates an example method for communicating endorsable information to a targeted potential endorser.

FIG. 4 illustrates an example method 400 that may be performed in connection with one or more of the embodiments that have been presented herein. While these steps or method acts are illustrated in the order shown, one skilled in the art will appreciate that the steps may be performed in a different order and are not limited to the order depicted herein.

In particular, FIG. 4 first shows that an endorsable electronic instrument sent from an endorsement requesting party is received (act 410). Then, according to FIG. 4, a mobile phone number that is associated with a targeted potential endorser is also received (act 420). Once the mobile phone number and the endorsable electronic instrument are received, then the mobile phone is associated with the endorsable electronic instrument (act 430). Afterwards, the endorsable electronic instrument and a verification request is sent to the targeted potential endorser using the mobile phone number (act 440).

While not shown in FIG. 4, additional steps or method acts may be performed in connection with the method 400 described above. For example, in one embodiment, after the endorser reviews the endorsable electronic instrument and determines that it is suitable for endorsement, a notification can be received by the endorsement requesting party that the endorser has reviewed and endorsed the electronic instrument. By way of example and not limitation, the endorsement requesting party may receive a confirmation email indicating that the endorser has endorsed the instrument. Other methods of notification are available as well (e.g. text message, social media notification, etc.).

Furthermore, while the notification may indicate that the endorsement event has occurred, the notification may also actually include a copy of the endorsed instrument as well as additional verification information that can be used to act as validation of the endorsement. Some examples of this additional verification information have been discussed herein and include, but are not limited to, image data that is associated with the endorser, video data, and sound data. Combinations of the foregoing are also available to act as verification of the endorsement.

Some embodiments may be configured to require one or more forms of additional verification information from the mobile device of the endorser in order to satisfy an identity validation. For example, some embodiments may configure one or more data structures and/or computer components with security parameters such that the computer system provides a positive identity validation only upon receiving verification information satisfying one or more of the security parameters In addition to the steps outlined above, other steps may be taken in order to provide additional verification of the authenticity of the endorsement. As stated, after the instrument has been endorsed, a confirmation notification (e.g. an email) may be created. Some additional validation information may be contained within this notification. For example, the notification may include a hash code or other hash data. To clarify, a document, an image of the endorsement, and/or a picture of the user/endorser may all be hashed together into a particular hash code that may be presented in the confirmation notification. While this example uses three distinct forms of data that are hashed together, one skilled in the art will appreciate that more, or less, data may be included among the data that is to be hashed; for instance, the data may also include date and time data, or any other relevant data. As a result of the hash, a string of letters and numbers are produced that can only be produced by these particular inputs and therefore provide demonstrable evidence of the endorsement.

Additionally, after the endorser endorses the instrument, the instrument, or a record corresponding to the instrument (e.g. the confirmation notification), may be entered into a verifiable public log. Entering the instrument and/or record into a public log provides additional assurance regarding the authenticity of the endorsement while also serving as traceable evidence of the endorsement. While either the instrument or the record (or both) may be publicized, preferably only the record is publicized. This is preferable primarily for security reasons (i.e. information contained within the instrument itself may not be desired to be made public). As a result, if only the record is made public, then many security risks can be avoided and/or mitigated.

In light of the preceding disclosure, one manner in which the record, which may contain the hash code or some other verification information, may be made available to a public log is to use social media. By way of example and not limitation, a tweet in a publicly accessible Twitter account may be entered by a user to publicize the record. An additional example of using a public log to publicize the record may be a transfer between two Bitcoin accounts where the hash code is contained within an embedded message. Regardless of the medium used, the important point is that the verification record is publicized with a verifiable timestamped record.

Elements of embodiments described herein may be combined with elements of other embodiments described herein. Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computer system, comprising:
   one or more processors; and
   memory having stored thereon computer-executable instructions that are executable by the one or more processors to configure the computer system to perform at least the following:
      receive an endorsable electronic instrument from an endorsement requesting party;
      receive a mobile phone number associated with a targeted endorser;
      generate a link to an endorsement application at which the endorsable electronic instrument is accessible to the targeted endorser, wherein the generated link is associated with a time limit after which the generated link is no longer active;
      send the generated link and a verification information request in one or more messages targeted to the mobile phone number associated with the targeted endorser, the verification information request including a request for imagery of the targeted endorser;
      receive an endorsed electronic instrument and electronic verification information at the endorsement application, the electronic verification information including imagery data and including a time stamp indicating when the imagery data was captured,
      wherein the received imagery data is validated at least according to,
         whether the time stamp is sufficiently recent based on a time or time period, and
         whether the imagery data sufficiently matches expected imagery data based on performing a facial recognition algorithm on the received imagery data, the facial recognition algorithm comparing facial information identified in the received imagery data with facial information identified in one or more images obtained from social media.

2. The computer system of claim 1, wherein the verification information request includes a request for an image of the endorser according to a particular pose, and wherein validating the received imagery data comprises performing an image recognition algorithm on the received imagery data to recognize the particular pose.

3. The computer system of claim 1, wherein the verification information request includes a request for video of the targeted endorser performing a particular gesture, and wherein validating the received imagery data comprises performing an image recognition algorithm on the received imagery data to recognize the particular gesture.

4. The computer system of claim 1, wherein validating whether the time stamp is sufficiently recent based on a time or time period is used to prevent reuse of image data.

5. The computer system of claim 1, wherein the verification information request includes a request for an image of a particular alphanumeric code, and wherein validating the received imagery data comprises performing an image recognition algorithm on the received imagery data to recognize the particular alphanumeric code.

6. The computer system of claim 1, wherein the verification information request additionally includes a request for entry of a biometric indicator.

7. The computer system of claim 6, wherein the request for entry of the biometric indicator includes a request for a fingerprint.

8. The computer system of claim 1, wherein the verification information request additionally includes a request for a voice recording.

9. The computer system of claim 1, wherein the one or more messages targeted to the mobile phone number associated with the targeted endorser include at least one SMS message or at least one MMS message.

10. A method implemented at a computer system that includes one or more processors, the method comprising:
    receiving an endorsable electronic instrument from an endorsement requesting party;
    receiving a mobile phone number associated with a targeted endorser;
    generating a link to an endorsement application at which the endorsable electronic instrument is accessible to the targeted endorser, wherein the generated link is associated with a time limit after which the generated link is no longer active;
    sending the generated link and a verification information request in one or more messages targeted to the mobile phone number associated with the targeted endorser, the verification information request including a request for imagery of the targeted endorser;
    receiving an endorsed electronic instrument and electronic verification information at the endorsement application, the electronic verification information including imagery data and including a time stamp indicating when the imagery data was captured,
    wherein the received imagery data is validated at least according to,
        whether the time stamp is sufficiently recent based on a time or time period, and
        whether the imagery data sufficiently matches expected imagery data based on performing a facial recognition algorithm on the received imagery data, the facial recognition algorithm comparing facial information identified in the received imagery data with facial information identified in one or more images obtained from social media.

11. The method of claim 10, wherein the verification information request includes a request for an image of the endorser according to a particular pose, and wherein validating the received imagery data comprises performing an image recognition algorithm on the received imagery data to recognize the particular pose.

12. The method of claim 10, wherein the verification information request includes a request for video of the targeted endorser performing a particular gesture, and wherein validating the received imagery data comprises performing an image recognition algorithm on the received imagery data to recognize the particular gesture.

13. The method of claim 10, wherein validating whether the time stamp is sufficiently recent based on a time or time period is used to prevent reuse of image data.

14. The method of claim 10, wherein the verification information request includes a request for an image of a particular alphanumeric code, and wherein validating the received imagery data comprises performing an image recognition algorithm on the received imagery data to recognize the particular alphanumeric code.

15. The computer system of claim 10, wherein the one or more messages targeted to the mobile phone number associated with the targeted endorser include at least one SMS message or at least one MMS message.

16. A computer program product comprising one or more hardware storage devices having stored thereon computer-executable instructions that are executable by one or more processors to configure a computer system to perform at least the following:
    receive an endorsable electronic instrument from an endorsement requesting party;
    receive a mobile phone number associated with a targeted endorser;
    generate a link to an endorsement application at which the endorsable electronic instrument is accessible to the targeted endorser, wherein the generated link is associated with a time limit after which the generated link is no longer active;
    send the generated link and a verification information request in one or more messages targeted to the mobile phone number associated with the targeted endorser, the verification information request including a request for imagery of the targeted endorser;
    receive an endorsed electronic instrument and electronic verification information at the endorsement application, the electronic verification information including imagery data and including a time stamp indicating when the imagery data was captured,
    wherein the received imagery data is validated at least according to,
        whether the time stamp is sufficiently recent based on a time or time period, and
        whether the imagery data sufficiently matches expected imagery data based on performing a facial recognition algorithm on the received imagery data, the facial recognition algorithm comparing facial information identified in the received imagery data with facial information identified in one or more images obtained from social media.

* * * * *